(12) United States Patent
Herberger et al.

(10) Patent No.: US 10,496,250 B2
(45) Date of Patent: Dec. 3, 2019

(54) SYSTEM AND METHOD FOR IMPLEMENTING AN INTELLIGENT AUTOMATIC MUSIC JAM SESSION

(71) Applicant: MAGIX AG, Berlin (DE)

(72) Inventors: Tilman Herberger, Dresden (DE); Titus Tost, Dresden (DE)

(73) Assignee: BELLEVUE INVESTMENTS GMBH & CO, KGAA (DE)

( * ) Notice: Subject to any disclaimer, the term of this patent is extended or adjusted under 35 U.S.C. 154(b) by 1549 days.

(21) Appl. No.: 13/720,552

(22) Filed: Dec. 19, 2012

(65) Prior Publication Data

US 2014/0006945 A1 Jan. 2, 2014

Related U.S. Application Data

(60) Provisional application No. 61/577,432, filed on Dec. 19, 2011.

(51) Int. Cl.
*G06F 3/0484* (2013.01)

(52) U.S. Cl.
CPC .................. *G06F 3/0484* (2013.01)

(58) Field of Classification Search
CPC ............... G06F 3/0484; G10H 1/0033; G10H 2240/175; G10H 2240/145; G10H 2210/385
USPC ....................................................... 715/716
See application file for complete search history.

(56) References Cited

U.S. PATENT DOCUMENTS 5,404,316 A  4/1995 Klingler et al.
5,467,288 A  11/1995 Fasciano et al.
5,469,370 A  11/1995 Ostrover et al.
5,488,196 A * 1/1996 Zimmerman ........ G10H 1/0033
        84/612
5,496,962 A * 3/1996 Meier .................. G10H 1/0025
        84/601

(Continued)

FOREIGN PATENT DOCUMENTS

EP    1666967 A1    6/2006

OTHER PUBLICATIONS https://www.youtube.com/watch?v=GGf8Q6Dw5jM, youtube screenshot video titled "Pioneer 2011 AV Receivers—iControlAV2", published Mar. 8, 2011, see time mark 1:13 (Year: 2011).*

*Primary Examiner* — Arpan P. Savla
*Assistant Examiner* — Henry Orr
(74) *Attorney, Agent, or Firm* — Crowe & Dunlevy; Terry L. Watt

(57) ABSTRACT

According to a preferred aspect of the instant invention, there is provided a system and method that allows the user to implement an intelligent automatic music jam mode. The jam mode is adaptable to both novice and professional users, wherein the user is able to define in real-time a plurality of different settings which are instantly utilized and which provide instant results for the user. In an automatic mode the instant invention will pick settings autonomously, for example song part definition, tone pitch and instruments. In absence of constant user interaction the instant invention enters a creative mode wherein the initial user defined settings are varied to introduce variance into the jam session. The system and method also monitors data input by instruments connected and played by the user and intelligently adapts the setting selection accordingly.

13 Claims, 5 Drawing Sheets

(56) References Cited

U.S. PATENT DOCUMENTS

| | | | |
|---|---|---|---|
| 5,627,335 A * | 5/1997 | Rigopulos | G10H 1/00 84/611 |
| 5,682,326 A | 10/1997 | Klingler et al. | |
| 5,754,179 A | 5/1998 | Hocker et al. | |
| 5,760,767 A | 6/1998 | Shore et al. | |
| 5,781,188 A | 7/1998 | Amiot et al. | |
| 5,801,694 A | 9/1998 | Gershen | |
| 5,861,880 A | 1/1999 | Shimizu et al. | |
| 5,886,698 A | 3/1999 | Sciammarella et al. | |
| 5,979,716 A | 10/1999 | Davis et al. | |
| 5,999,173 A | 12/1999 | Ubillos | |
| 6,011,212 A * | 1/2000 | Rigopulos | G10H 1/00 84/610 |
| 6,134,243 A | 10/2000 | Jones et al. | |
| 6,154,207 A | 11/2000 | Farris et al. | |
| 6,204,840 B1 | 3/2001 | Petelycky et al. | |
| 6,222,537 B1 | 4/2001 | Smith et al. | |
| 6,243,087 B1 | 6/2001 | Davis et al. | |
| 6,388,181 B2 | 5/2002 | Moe | |
| 6,400,378 B1 | 6/2002 | Snook | |
| 6,426,778 B1 | 7/2002 | Valdez, Jr. | |
| 6,544,293 B1 | 4/2003 | Ohanian | |
| 6,573,909 B1 | 6/2003 | Nagao | |
| 6,662,231 B1 | 12/2003 | Drosset | |
| 6,925,608 B1 | 8/2005 | Neale et al. | |
| 6,928,433 B2 | 8/2005 | Goodman et al. | |
| 7,124,366 B2 | 10/2006 | Foreman et al. | |
| 7,161,080 B1 * | 1/2007 | Barnett | G10H 1/342 84/612 |
| 7,295,977 B2 | 11/2007 | Whitman et al. | |
| 7,319,185 B1 * | 1/2008 | Wieder | G10H 1/0041 84/609 |
| 7,434,170 B2 | 10/2008 | Novak et al. | |
| 7,454,329 B2 | 11/2008 | Abe et al. | |
| 7,582,823 B2 | 9/2009 | Kim et al. | |
| 8,175,288 B2 * | 5/2012 | Lengeling | G10H 1/20 381/80 |
| 2003/0002851 A1 | 1/2003 | Hsiao et al. | |
| 2003/0030661 A1 | 2/2003 | Miyauchi et al. | |
| 2004/0025671 A1 * | 2/2004 | Mack | G10G 1/00 84/613 |
| 2004/0074377 A1 * | 4/2004 | Georges | G10H 1/0025 84/609 |
| 2005/0010589 A1 | 1/2005 | Novak et al. | |
| 2005/0022132 A1 | 1/2005 | Herzberg et al. | |
| 2006/0016322 A1 | 1/2006 | Randle et al. | |
| 2006/0048076 A1 | 3/2006 | Vronay et al. | |
| 2006/0079213 A1 * | 4/2006 | Herberger | H04H 60/80 455/414.1 |
| 2006/0112808 A1 | 6/2006 | Kiiskinen et al. | |
| 2006/0180007 A1 * | 8/2006 | McClinsey | G10H 1/0008 84/645 |
| 2006/0181537 A1 | 8/2006 | Vasan et al. | |
| 2007/0107584 A1 | 5/2007 | Kim et al. | |
| 2007/0137463 A1 * | 6/2007 | Lumsden | G10H 1/0025 84/603 |
| 2007/0176922 A1 | 8/2007 | Ikeda et al. | |
| 2007/0245257 A1 | 10/2007 | Chan et al. | |
| 2008/0190271 A1 * | 8/2008 | Taub | G10H 1/0058 84/645 |
| 2008/0301128 A1 | 12/2008 | Gandert et al. | |
| 2008/0314228 A1 | 12/2008 | Dreyfuss et al. | |
| 2009/0013004 A1 | 1/2009 | Manukyan et al. | |
| 2009/0132077 A1 | 5/2009 | Fujihara et al. | |
| 2009/0132591 A1 | 5/2009 | Toms et al. | |
| 2009/0193351 A1 | 7/2009 | Lee et al. | |
| 2009/0228481 A1 | 9/2009 | Neale et al. | |
| 2010/0077306 A1 * | 3/2010 | Shaffer | G09B 15/00 715/716 |
| 2010/0305732 A1 * | 12/2010 | Serletic | G06F 3/0481 700/94 |
| 2011/0271187 A1 * | 11/2011 | Sullivan | G10H 1/0025 715/716 |
| 2012/0014673 A1 * | 1/2012 | O'Dwyer | G06F 3/0346 386/282 |
| 2012/0297959 A1 * | 11/2012 | Serletic | G06F 3/0481 84/626 |
| 2013/0025437 A1 * | 1/2013 | Serletic | G10H 1/0025 84/634 |
| 2014/0006945 A1 * | 1/2014 | Herberger | G06F 3/0484 715/716 |

* cited by examiner

- ACTIVATE JAM MODE — 300
- SELECT STYLE — 310
- SET TEMPO — 320
- SELECT PITCH — 330
- DEFINE SONG PARTS — 340
- SELECT INSTRUMENT — 350
- ALTERNATE SETTINGS — 360
- RECORD JAM SESSION — 370

SYSTEM AND METHOD FOR IMPLEMENTING AN INTELLIGENT AUTOMATIC MUSIC JAM SESSION

This application claims the benefit of U.S. Provisional Patent Application Ser. No. 61/577,432 filed on Dec. 19, 2011 and incorporates said provisional application by reference into this document as if fully set out at this point.

FIELD OF THE INVENTION

The present invention relates generally to the field of multimedia editing and, more generally, to automatically composing musical works with intuitive user interaction.

The field of music editing and generation has undergone substantial change in recent years. Among the more significant changes is that music generation went from a work intensive and time consuming process of learning to play and master a real instrument to one that based around the use of computerized techniques to generate new music works.

Despite all the technological advances, computer driven/digital data driven composition has never completely supplanted the traditional way of making music by playing actual instruments. That being said, a number of approaches are available wherein computers and instruments can be used in together to help a user compose music. These approaches, however, are typically very limited in that the user enters music into the computer via an instrument and the computer records the music. The computer may additionally provide, for example, background music or supporting music to accompany the user's performance. This accompaniment, however, once initiated is static or at least always depends on continuous input by the user to change particulars, like the music itself, or the key, rhythm or pitch which prevents the user from concentrating on playing the instrument.

Thus, what is needed is a system and method that supports a user when generating music, wherein the level of support is adjustable by the user. The level of support should be variable and include approaches such as fully automatic, user driven selection, and real-time automatic accompaniment generation for a user who is playing an instrument. Additionally what is needed is a system and method that smoothly combines the traditional approach to music creation—with instruments—with a computer based music clip driven approach.

Heretofore, as is well known in the media generating and editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for implementing an intelligent automatic music jam session preferably with and on a touch based interaction device.

In a preferred embodiment, the instant invention will provide the user with an option to initiate a jam session with or without the utilization of an instrument that is used as input to the computer. In either case the user will be able to intuitively interact with a graphical user interface to define the specifics of the music jam session.

In a preferred arrangement, a user will initially and continuously select and initiate options in a graphical user interface preferably via touch interaction. The options may comprise the selection of a specific music style, the definition of a tempo, of volume, the selection of one or a number of instruments, the selection of pitch and also the definition of sections of a musical work. The options provided will allow even a novice user to initiate a jam session. However the instant invention will not be limited to use by a novice, a professional user will be able to select and initiate program options that provide more control and influence during the jam session.

An embodiment of the instant invention will further allow the user to initiate an intelligent automatic setting for either the individual sections of a music section, for the selection of the tone pitch and for the selection of the instruments or for all of these options together. The selection of automatic settings for the instant invention is called the creative mode, a mode in which the instant invention randomly and continuously picks different music sections, chooses different instruments, and/or changes the melody/tone pitch by itself. Additionally the user will be able to connect an instrument to the computer and initiate a jam session. In such an instance, the instant invention will read and react to the music played by the user and adapt the selection of music sections of the music piece and therewith the selection of individual music clips to the input of the user. Furthermore the instant invention will adapt the selection of tone pitch, tempo, and instruments to the way the user is playing.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Figure 1:
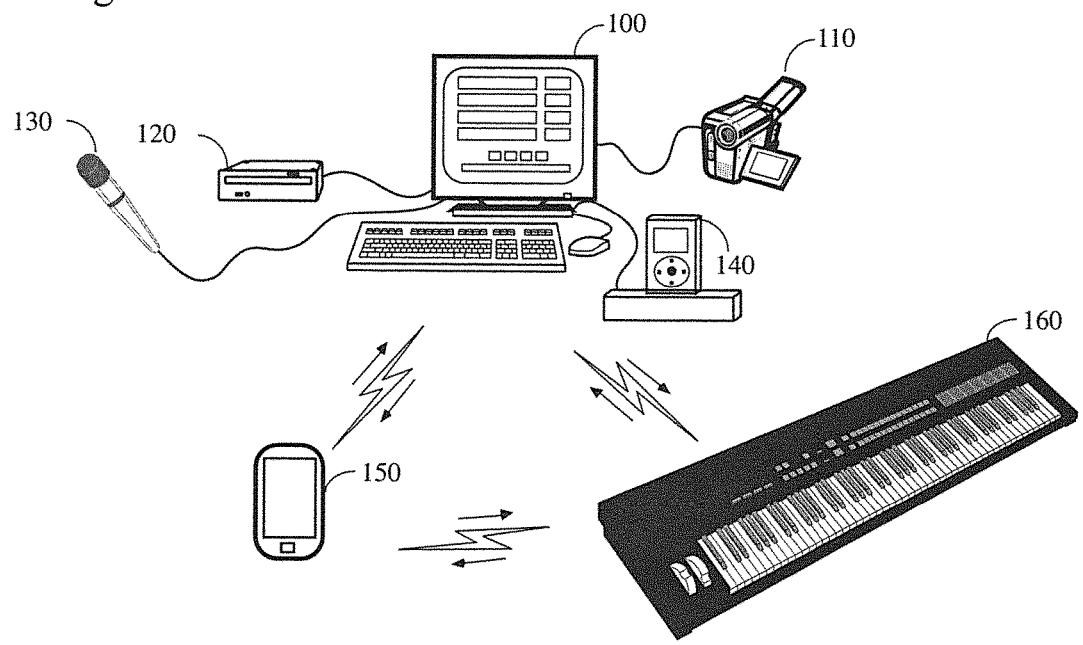
FIG. 1 depicts a general working environment of the instant invention.

Referring now to the drawings, wherein like reference numerals indicate the same parts throughout the several views, there is provided a preferred system and method for implementing an intelligent automatic music jam session.

As is generally indicated in FIG. 1, at least a portion of the instant invention will be implemented in form of software running on a user's computer 100. Such a computer will have some amount of program memory and hard disc storage (whether internal or accessible via a network) as is conventionally utilized by such units. Additionally it is possible that an external camera 110 of some sort be utilized with—and will preferably be connectible to—the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized.

Additionally a microphone 130 might be utilized so that the user can add voice-over narration to a multimedia work or can control his or her computer via voice-recognition software. A CD or DVD burner 120 could be useful for storing content on writable or rewritable media. Additionally it might be possible that a mobile data storage device 140 might be connected to the computer, such as an mp3 player for example, for storage of individual music clips or other data as needed by the instant invention. Furthermore in some embodiments the user would bring a smart phone 150 or other touch based device (e.g., a tablet computer such as a Microsoft® Surface® table or an iPad®, or other device with a touch-sensitive display) into communication with the computer in order to, for example, control the computer or exchange data between the computer and the device.

According to an embodiment of the instant invention, the user might also be able to connect instruments such as a keyboard 160 to the computer to allow for the input and recording of music data directly from the user.

The process of the instant invention will provide a user-friendly preferably touch-based graphical user interface via music generation and editing software. The method will preferably utilize MIDI loops or audio clips organized into styles, with these MIDI loops being enhanced with a classification into song parts.

The loops will also be tagged with data that is then used by the instant invention during the music generation process. These tags represent a classification of the loops—as song parts, pitch and melody qualification. A well organized and tagged database of MIDI loops or audio loops is an essential part of the instant invention. Such a database of MIDI loops or a selection of individual styles referring to the MIDI loops will preferably be provided by the instant inventors.

The type, layout and interaction possibilities of the graphical user interface will be accessible, in some embodiments, by the user with mouse and keyboard. However, the instant invention will be especially useful when used in connection with a touch interface, if the device(s) on which the instant invention is executed provide such a possibility.

The music generation, or jam mode of the instant invention will react to the user interactions and user input in real time, incorporating the users activities into the music generation process. This will give the user instantaneous dynamic feedback and sense of achievement. Each different interaction of the user, the selection of a different tone pitch, the selection and de-selection of a different instrument or the definition of a different song part will be incorporated almost instantly by the instant invention, however in a preferred embodiment only after the next bar is reached.

The present invention will preferably begin with the initiation by the user of the music generation process—the live jam mode. The live jam mode might be a component part of a general music generation software or it might be a standalone program.

In an embodiment, the user will be presented with a graphical user interface 200 containing controls for all essential settings. All of these controls will be selectable and changeable by the user at any time both before and during the music generation process, with the selections made by the user being incorporated by the instant invention into the music generation process in real time.

The user preferably will preferably start with the selection of a music style 210, a style which will then be used in connection with the created music work as long as it is selected. The user will also be able to define and change the tempo 220 of the music work. A volume control 230 will be provided which will allow the user to change the output volume. In some embodiments, the volume control 230 will affect only the voice that is currently selected in the voice bank 270 (e.g., keyboard 275), thereby adjusting the volume of the selected voice as compared with the other currently active/selected voices 260. In other instances, it could be used to control the total audio volume as heard through an attached speaker or headphones. The overall volume setting will generally not be stored by the instant invention during the music generation process (i.e., preferably the setting of the output volume will not effect the volume of the musical work that is subsequently saved), although in some instances it might be tracked in order to adjust the relative volume of one instrument/part with respect to another during playback.

In addition, in an embodiment there will be a number of controls and settings that allow the user to direct the music generation process, i.e., to influence the live jam mode on a deeper level. The user will preferably be able to define and select individual song parts 240 which can be combined to create a complete song. That is, in some embodiments the user will be able to signal to the instant invention that he or she wants the music that is being created to transition into the next phase, e.g., from the introduction, to the verse. The instant invention will then select and play MIDI or music loops that are compatible with or representative of the selected song section. The instant invention will provide the user with an assortment of different song parts that allow the user to control the song structure. For example, by selecting the "Intro" option the instant invention will incorporate at least one music or MIDI loop that is tagged with the "intro" tag and has a tempo, chord structure, etc., compatible with an introduction. Other possibilities include such parts as verse, chorus, bridge, outro, etc., as those terms are known in the music arts.

Returning to FIG. 2, the instant invention in this embodiment has provided parts labeled "Ending", "VAR1", "Fill" and "VAR2," selection of which will cause the instant program to insert different music or MIDI loops that contain music that adheres to the selected style, and pitch and to the selected song part. For purposes of the instant disclosure, it should be noted that "VAR1" and "VAR2" stand for variations and "Fill" represents music material that is usable as fill material as those terms are known and understood in the art. In an embodiment, the selection of "Ending" will insert a music or MIDI loop that provides an ending to the current music piece, allowing the user to end the generated song in a musically pleasing and/or correct fashion. It should be noted that after the selection of the "VAR1" or "VAR2" song part, the instant invention will preferably cycle through the audio loop material that is available to prevent the same audio loops from being selected for, by way of example, four consecutive bars. The instant invention will preferably do that for all audio loops, including both loops containing melody based instruments as well as loops containing drum and bass audio material.

For the novice user the selection of the "automatic" option regarding the song part setting 240 will also be possible. In this variation, the instant invention will preferably generate and select the song parts automatically (e.g., intro, verse, chorus, outro, ending) and the user will be provided with a fully rough structured song.

Additionally, and in some embodiments, the instant invention will provide an effects option 242. Preferably, when the user selects this on-screen icon an opportunity will be provided to apply, modify, or remove various audio effects (e.g., filters, reverb, flange, etc.).

In some embodiments, when the user selects the PLAY control 292 the instant invention will automatically start the music generation process. In this example, this will cause the program to utilize the user's selected style, song parts, tone pitch/key and instruments in the generation process. Preferably when the PLAY control 292 is selected, the REC control 295 will be activated too, thereby initiating the recording process. By selecting the REC control 295 again, in some embodiments the user will indicate to the instant invention that the generation and recording of the current music work is to be ended. In this instance, the instant invention will insert a music loop representing an ending in order to complete the music generation process for the current music piece.

A pitch setting 250 will also be provided in some embodiments. This option will allow the user to select individual tone pitch/note values manually or to select an automatic setting wherein the instant invention will automatically generate tone pitch/note changes accordingly. In an embodiment, the currently selected and active tone pitch will be displayed in the graphical user interface. However it is also preferable that the real key will also be displayed to the user, so that the user who playing along with the instant invention via a connected instrument will be able to play in the correct key. However it is also possible, and within the scope of the instant invention, for the user to ignore the key and play as he sees fit. In that case, the instant invention will preferably select tone pitch/note settings in order to adapt to generated song to the playing of the user, thereby generating a musically pleasing music work. If a specific tone pitch has been selected by the user then the instant invention will generate the music—i.e., it will initiate the jam mode in the selected tone pitch/key as long as it is selected.

In addition to the already described user controls, in an embodiment the user will also be able to define and select the instruments that are to be used in generating the music. In some embodiments, the graphical user interface will provide an instrument selection bar 260 displays the current voice selection (i.e., the voice bank 270). In an embodiment the user will be able to select and de-select individual instruments dynamically which changes will be reflected in real time via external speakers, headphones, etc. Preferably, the inclusion/exclusion and change of instruments can be done at any time and without any restrictions, although the instant invention also provides an automatic setting, which when activated, utilizes and automatically selects instruments that are available according to the currently selected style. The instant invention will select/deselect and change these instruments in an alternating fashion to generate a pleasing music work.

Figure 3:
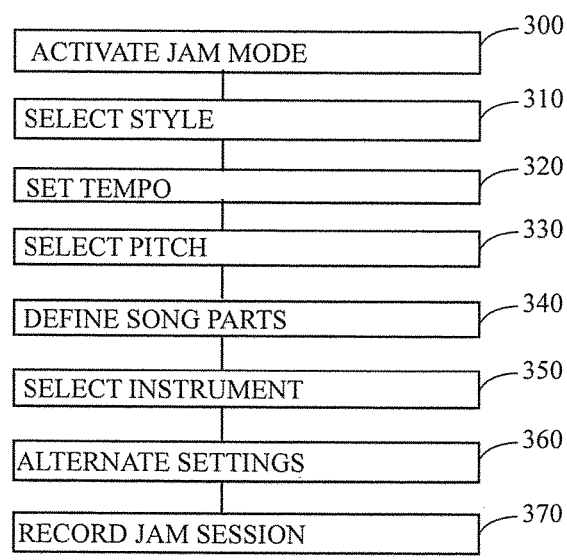
FIG. 3 illustrates a general workflow suitable for use with the instant invention.

FIG. 3 provides a summary of a preferred workflow of the instant invention. In a first preferred step the user will activate the jam mode 300. Next, and preferably, the user will select a style 310, the tempo 320, the tone pitch 330, the individual song parts 340 and the preferred instruments 350. However, it should be noted that these settings do not necessarily need to be defined sequentially before the start of the music generation process. They will be selectable and changeable the whole time that the jam mode is active. This will encourage the user to alternate between multiple ones of the available settings 360. In an embodiment, the instant invention will automatically incorporate the changed settings into the jam mode—the music generation process will be modified dynamically in real time.

The instant invention will record 370 the generated music while jam mode is active and store it on a computer. The store might be hard disc, a flash based memory device, etc. The recording will then be available for the user for further additional processing if that is desired.

Figure 4:
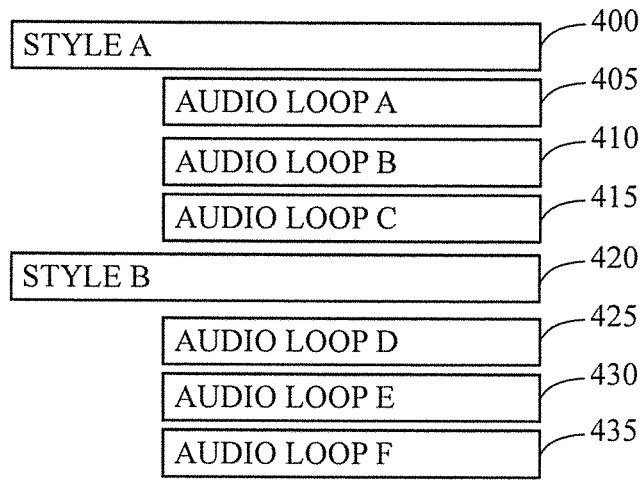
FIG. 4 depicts a general layout of the data structure of the audio material suitable for use with the instant invention.

FIG. 4 illustrates a preferred data structure of the instant invention. The instant invention utilizes, in an embodiment, an organized and data structure. This database will be provided in some instances by the instant inventors. In some embodiments, a limited set of styles might be provided initially, with additional styles available on demand and for a fee. Where a user desires additional styles, the order will be initiated by the user, with the new styles being transmitted digitally directly to the user. Of course, it is also possible that the purchased styles might be shipped on a storage medium after purchase. The user's styles could be stored either locally on the user's computer, or remotely and access via a LAN, Wi-Fi, the Internet, etc. Each style will preferably be stored and named internally according to a simple naming scheme. For example, see Style A 400, where each style has a specific number of audio loops associated with that style. However, each of these loops (audio loop A 405, audio loop B 410, and audio loop C 415) need not be strictly associated with a single style. It is preferable and possible that an audio loop might be associated with multiple different styles (style b 420).

Figure 5:
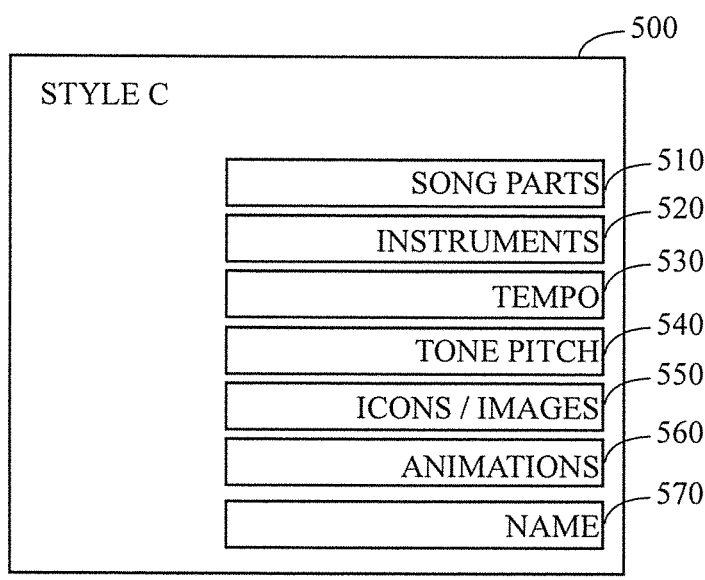
FIG. 5 illustrates one possible data content of the individual selectable styles of the instant invention.

FIG. 5 depicts a preferred data structure of one of the individual styles 500 of the instant invention. The data record associated with a style 500 will preferably contain information about the number of individual song parts that are available and selectable 510. Additionally, the number and type of individual instruments 520 that are part of the style will preferably stored in the data structure of each individual style. Each style will preferably have a predefined tempo 530. However it should be noted that once the user selects the style and interacts with the user controls, the predefined tempo might be changed automatically and/or manually by the user.

Additionally in some embodiments each style will have a predefined tone pitch 540 or key that can be modified by the user. Further, in an embodiment each style will contain icons 550 and animations 560 that are represent the corresponding instrument and/or the particular style. These pictures and animations will preferably be displayed in the graphical user interface as is generally indicated in FIG. 5. In some embodiments, the icons/images will be animated so that the user will be able to see a representation of a musician playing the selected instrument. Another preferred data value that could be stored with each style is the name 570 of that style which will be the name that is displayed in the graphical user interface for selection by the user.

Figure 6:
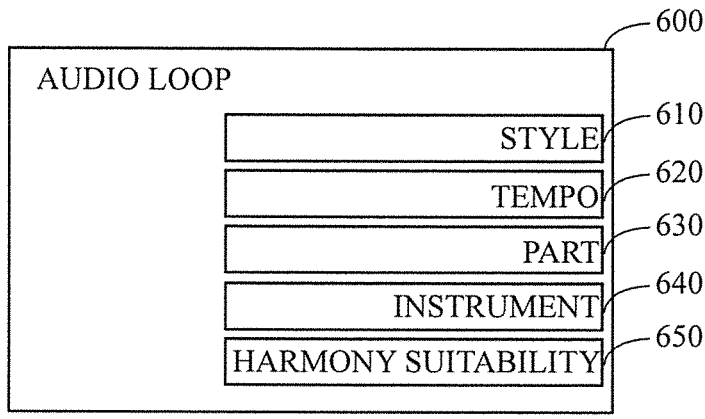
FIG. 6 illustrates one possible data structure and content of the audio loops suitable for use with the instant invention.

FIG. 6 depicts a preferred data structure for use with the individual audio loops 600. In this embodiment, the audio loops, in addition to the audio material, might contain information about the styles 610 with which they have been associated. This might be a plurality of styles, or only one style. Furthermore the audio loop has a specific predefined inherent tempo value 620, which is also stored in the data structure of the audio loop. Additionally information about the usability of the audio loop as a part 630 (intro, variance 1, variance 2, ending, etc.) in the music generation process will be stored in this data structure.

Each audio loop will additionally, and preferably, be associated with information regarding the instrument 640 the loop was taken from or created by. In some embodiments, an important value in the data structure of the audio loops will be the information about the harmony suitability 650 or compatibility of each clip with respect to the others. This quantity will indicate, in a general way, whether or not one audio loop is musically compatible with another. The harmony suitability could either be provided by the user and inserted into the data structure, or designed by the creator of the database based on a scale that indicates compatibility with another currently selected audio loop. Additionally it might be possible that the instant invention will determine the harmony suitability by first analyzing the data values of a selected audio loop and then comparing those values to the data of another audio loop to determine respective pitch, tempo, note scale (e.g., blues, minor, rock, etc.).

Figure 8:
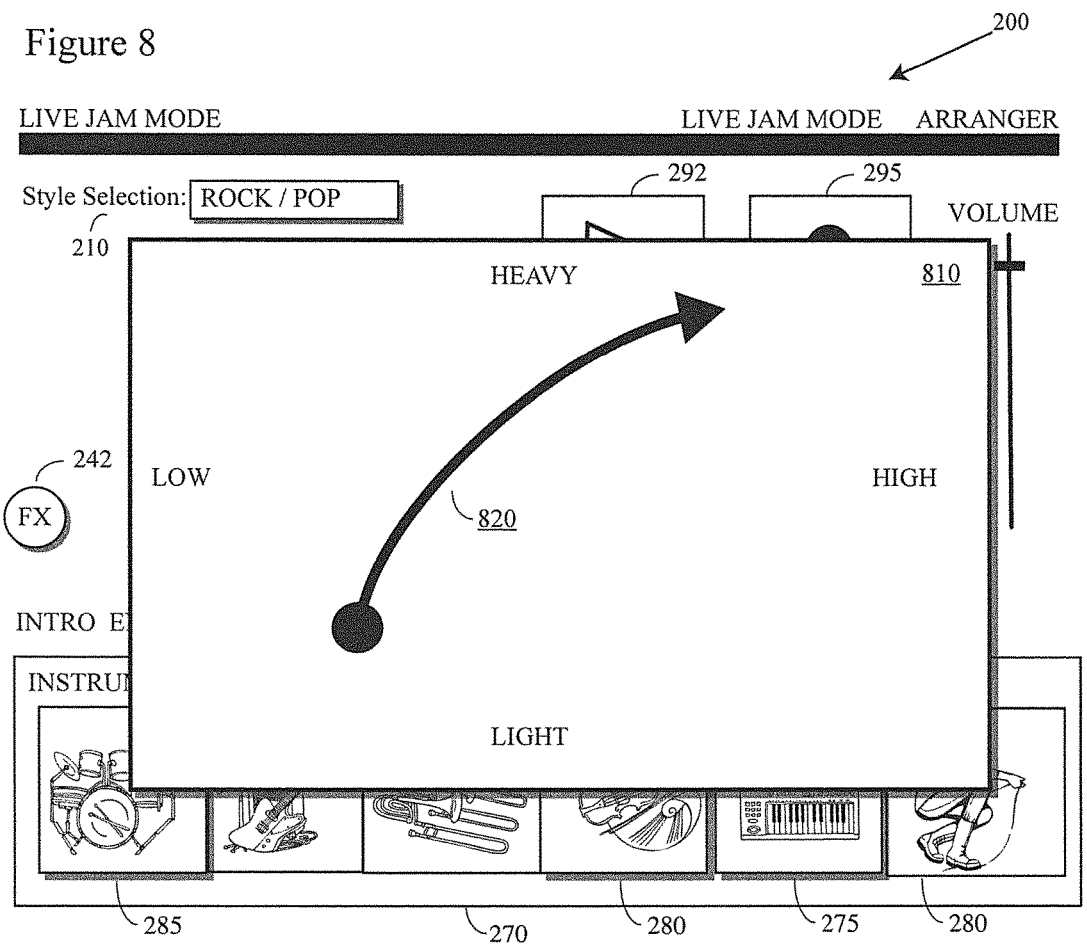
FIG. 8 illustrates one method by which filter settings might be altered in real time.

In some embodiments, and as is indicated in FIG. 8, the user might be provided with the option to modify the filter effects in real time. In this example, the effects button 242 has been activated which has brought a filter parameter window 810 to the forefront. In this figure, which would be most representative of the appearance of the instant invention while executing on a tablet computer, the user has been provided with the option of simultaneously adjusting two parameters by way of a stroke 820 across the face of the open window 810. In this instance, the user will be able to simultaneously modify two parameters, although it should also be clear that a single parameter (or three or more) could be similarly modified. In FIG. 8, the audio center frequency might be modified ("HIGH" to "LOW") and/or the reverb ("HEAVY" to "LIGHT"). In this example, the user has elected to increase the center frequency and increase the reverb by virtue of this single stroke 820. Clearly, other variations of this approach are possible and have been specifically contemplated by the instant inventors.

Figure 7:
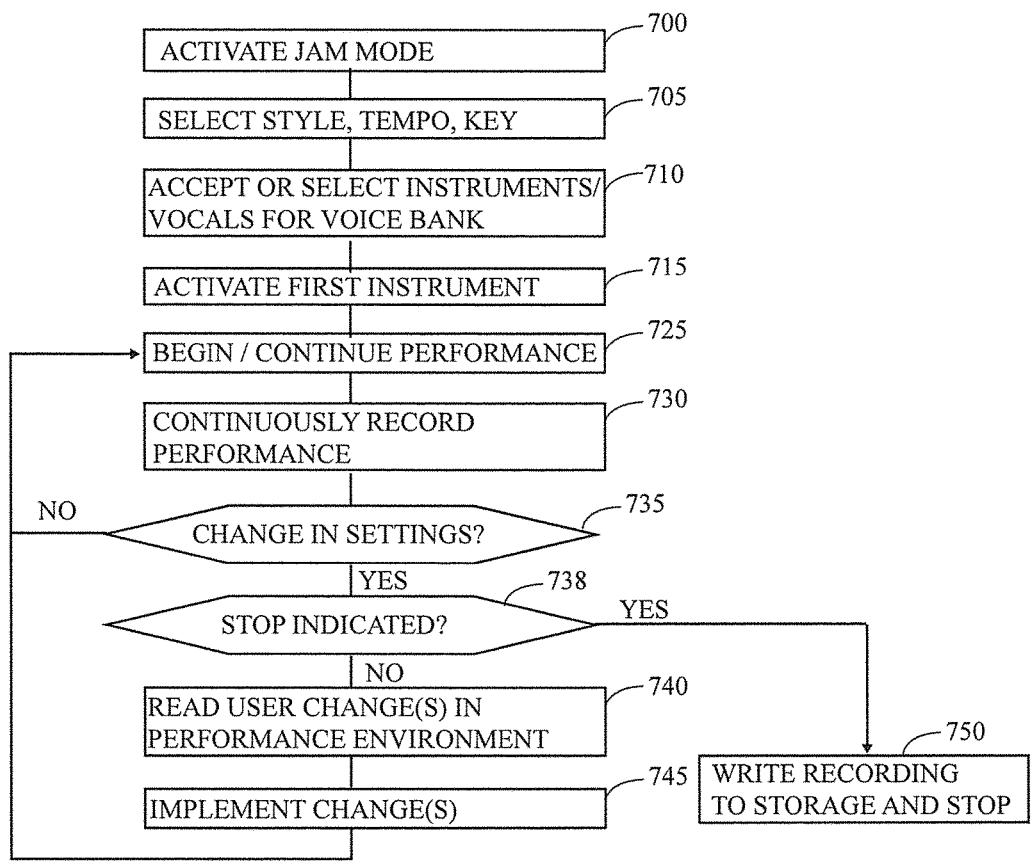
FIG. 7 contains a more detailed operating logic suitable for use with the instant invention.

Turning next to FIG. 7, according to one embodiment, the instant invention will be used in practice generally as indicated in this figure. As a first step in this embodiment, the jam mode will be activated (step 700). This will initiate the computer program that implements the instant invention on the device selected by the user which might include a desktop computer, a laptop computer, a smart phone, a tablet computer, etc. Next, in this embodiment, the style, tempo, and musical key of the work will be selected (step 705).

Although the choice of instruments (FIG. 2) might be conventional orchestral instruments (e.g., brass, woodwinds, violins or other stringed instruments, drum or other percussion, etc.) in some embodiments the user-specified style will guide selection of those instruments. Such a selection will automatically populate, in some embodiments, a voice bank 270 with a selection of alternative instruments that are suitable for the selected style. For example, in the embodiment of FIG. 2, selection of the rock/pop style will populate the instrument bank 270 with sounds from a rock drum set, guitars, electric or acoustic keyboards, etc. In other embodiments, e.g., where jazz is selected as the style, the voice bank 270 might include a vocal performance of scat lyrics. In still other embodiments, the selection of style will automatically populate the voice bank with horns, strings, woodwinds, etc., each of which will preferably have been selected to compliment the style selected by the user.

As a specific example, if the user selects, for example, a "salsa" style the associated instruments might include claves and/or drums (on percussion), acoustic guitar(s), bass, piano, flute, etc. The time signature will often be 12/8 or 6/8, but, in some embodiments it will be 4/4, 2/2, or 2/4.

As another example, if the user selects a "blues" style, the default instruments might be drums, guitar(s) (e.g., electric, slide, or acoustic), bass, harmonica, keyboard, fiddle (violin), etc. The time signature would most commonly be 4/4, but other choices are certainly possible. The form of the music could follow, by default, the standard 12 bar or 8 bar blues chord progressions, as those terms are known in the art. The solo instruments (e.g., lead guitar, harmonica, keyboard, etc.) would often be restricted to playing the standard blues scale (e.g., flatted third, fifth and seventh of the major scale), but other variations are certainly possible. The exact solo sequences that will be played in a given instance would be designed to follow and complete the current state of the underlying chord progression and complement it. Those sequences might be provided by the instant invention using standard riffs or sequences, or determined in real-time (e.g., randomly or according to some deterministic sequence) according to the desires of the user.

As a next preferred step 710, the user will accept the default voice bank 270 or select alternative instruments or vocals. That is, in some embodiments, the user might prefer, by way of example only, a distorted guitar sound as opposed to an acoustic guitar sound. In such an instance, the user will be able to either accept the instruments/vocals offered or replace any of those with another instrument or vocal sound.

Figure 2:
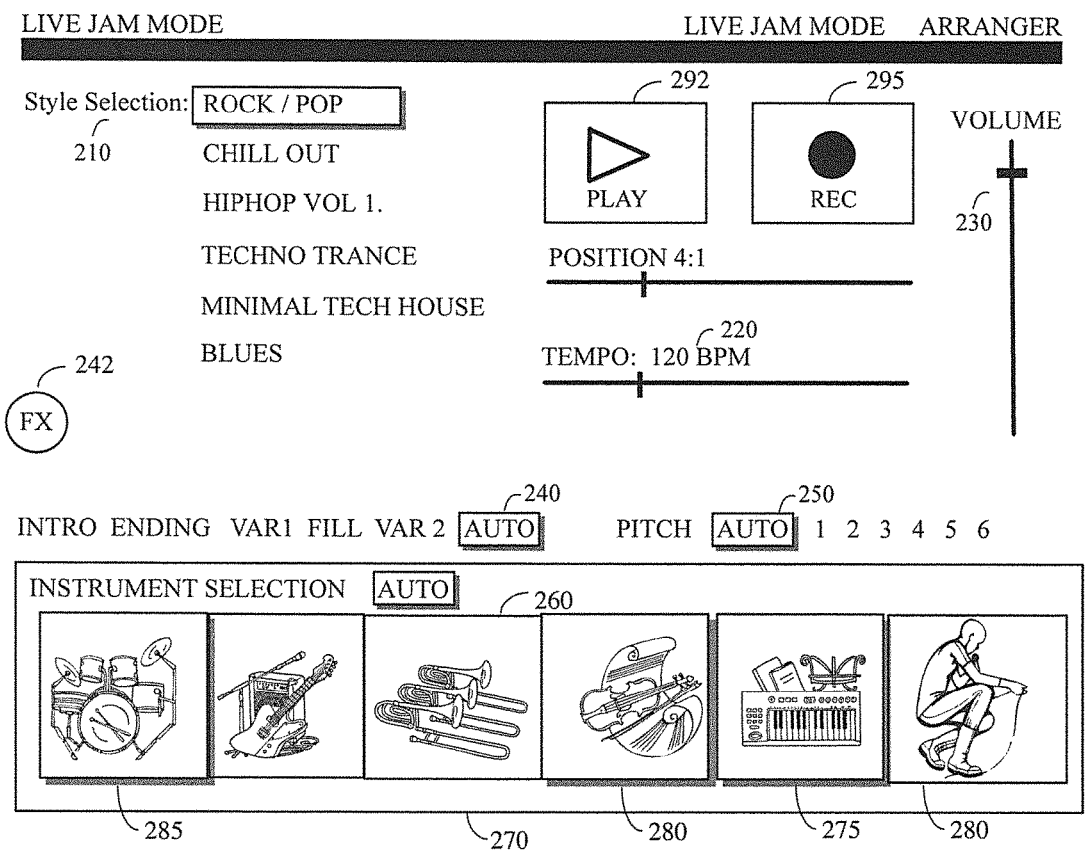
FIG. 2 illustrates a preferred graphical user interface of the instant invention.

Next, and preferably, the user will activate a first instrument (step 715) which will cause it to begin playing according to the parameters previously selected by the user. As is indicated in FIG. 2, the activated instruments 275, 280, and 285 will preferably be highlighted on the screen so that the user can readily tell which instrument or instruments have been activated and are, thus, in the current mix. In some embodiments, when the instant invention will execute on a tablet computer or other device with a touch-sensitive screen. In such environments, the user will merely need to touch the associated icon in order to activate or mute an instrument.

Upon activation of the first instrument, the instant invention will preferably automatically begin a performance of that instrument according to the selected style, at the selected tempo, and in the selected key or according to a selected pitch (step 725), etc. In an embodiment, the current state of the work will be communicated to the user as it is generated via a local speaker or, if the user is wearing headphones, to the user's headphones. This first instrument that is selected will provide the foundation for what is to follow. In many cases, the first instrument that is activated will be the drums, but that is not a requirement.

Next, the instant invention will, in some embodiments, begin to continuously record the performance (step 730). Of course, at the first iteration, there will typically be a single instrument that is playing but, subsequently, more instruments will be added as is discussed below. In some embodiments, for example, if the user has elected automatic generation of a music work, the recording will be initiated using all appropriate instruments. In that case, the user will select/deselect and modify the instruments that are currently playing as described below.

Returning to the example of FIG. 7, in an embodiment, the starting and stopping of the recording will be under the control of the user and the recording may not commence until after the user has added several instruments to the mix, at which time it will begin automatically. In other cases, no recording will be performed until the user specifically selects that option (e.g., via the on-screen "Record" button 295 in FIG. 2).

Next, if the user has made a change in the settings (decision item 735), the instant invention will preferably follow the "YES" branch. On the other hand, if no change has been made in the settings (i.e., the "NO" branch of decision item 735), the instant invention will preferably branch to step 725 and thereby continue to perform and, optionally, record the performance according the step 730.

If there has been a change in the settings per the "YES" branch of decision item 735, in some embodiments, a test will be performed to determine whether or not the change that has been made is an indication that the user wishes to stop the music generation process (decision item 738). If the user has decided to end the music creation process (i.e., the "YES" branch of decision item 738), the instant invention will preferably write whatever recording was made to non-volatile computer storage/computer readable media (e.g., magnetic disk, flash memory, CD, DVD, etc.) and stop the music creation process (step 750).

On the other hand, if there is no indication that user wishes to stop (the "NO" branch of decision item 738), the user will be given an opportunity to make changes in the performance environment (step 740). In this instance, and according to some embodiments, the user will be given the option of replacing any or all of the items in the instrument bank 270, adjusting the relative volume of each instrument in the mix, adjusting the tempo of the entire work, changing the style of the entire musical work, it's key, time signature, etc. In short, the user will be given the option of modifying any performance-related parameter in real time while the performance and/or recording is taking place (step 740). As is discussed in greater detail below, changed parameters will be instantly reflected in the audio output of the work, where "instantly" should be understood to mean that the changes will be performed at the next moment when it would make musical sense to do so (e.g., at the next beat, at the start of the next measure, etc.), i.e., at a moment that is musically synchronous with the instruments/style/tempo that are already in the performance. Said another way, in an embodiment, any change that the user makes in a performance variable will be immediately reflected in the audio output of the performance.

Next, and preferably, the change or changes indicated by the user will be implemented in the musical performance (step 745) in such a way as to harmoniously combine the additional, changed, or removed (muted) instruments/vocals with the current performance. This might mean, by way of example, matching the tempo of the current performance, its key, etc. Preferably, the new instrument will not enter the mix until the start of the next full measure of the performance but that is not a requirement. Of course, it is not a requirement that the modifications be only introduced at measure boundaries and, in some embodiments, the next beat (or $\frac{1}{8}^{th}$ note, $\frac{1}{16}^{th}$ note, etc.) could be used as an entry point. Any point of entry might be used so long as the entry is at musically synchronous moment so as to create a harmonious combined work. Those of ordinary skill in the art will readily be able to devise other methods of smoothly adding new instruments to the output mix.

In summary, the instant invention provides a highly creative work method for both novice and professional user when generating music or just enjoying music and the music generation process. The instant invention will adapt to the knowledge and professionalism of the user providing individual options and features for selection that either adds complexity (for professionals) or minimizes complexity (for novice users).

CONCLUSIONS

Of course, many modifications and extensions could be made to the instant invention by those of ordinary skill in the art. For example in one preferred embodiment the instant invention will enter a random creativity mode, wherein the method will automatically change and replace loops, instruments and pitch. This mode will be entered when the user interaction level is very low. In another preferred embodiment the user can link an instrument with the instant invention and the method will "listen" to the input from the instrument of the user and will accordingly select song parts, instruments and pitch to therewith generate a music work.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method for composing a musical work, comprising the steps of:
   (a) accessing an audio loop database containing a plurality of audio loops, each of said plurality of audio loops being associated with
   at least one musical style,
   a harmony suitability value,
   a tempo value,
   an indicium indicative of an instrument or instruments present in said audio loop,
   a tone pitch, and at least one associated song part;
(b) requiring a user to select using a computer graphical user interface
a performance musical style,
a performance tempo value,
a first performance song part, and
a performance key of the musical work;
(c) assembling a voice bank from said audio loop database, said voice bank being comprised of two or more of said plurality of audio loops, each of said assembled two or more of said audio loops having at least one of its associated at least one musical style a same style as said performance musical style;
(d) compiling a list of instruments present in said audio loops in said voice bank;
(e) presenting to the user on a display device at least a representation of said compiled list of instruments present in said voice bank,
a representation of a plurality of different song parts,
a representation of said performance key of said musical work, and
a representation of said performance tempo value;
(f) requiring the user to select from said displayed compiled list of instruments present in said voice bank at least one performance instrument,
(g) identifying within said voice bank at least one first audio loop having a same instrument present as said performance instrument;
(h) automatically accessing a first performance audio loop from among said identified at least one first audio loops;
(i) automatically modifying said first performance audio loop at least according to
said performance tempo value,
said first performance song part, and
said performance key, thereby producing a modified initial audio loop;
(j) initiating an audible performance of said modified first performance audio loop in said performance musical style;
(k) during said audible performance of said modified first performance audio loop,
(i) presenting to the user a window on a computer display containing indicia representative of two or more parameters, wherein each of said two or more parameters is simultaneously variable between a high value and a low value by way of a stroke across a face of said window;
(ii) receiving said stroke across the face of said window from the user, thereby receiving modified values of at least one of said two or more parameters;
(iii) modifying said audible performance of said modified first clip in real time according to said received modified values of at least one of said two or more parameters;
(l) determining a next beat in said audible performance of said modified first clip;
(m) during said audible performance of said modified first performance audio loop, requiring the user to select from said displayed compiled list of instruments at least one of
a second performance instrument, and
a second performance song part;
(n) if the user has selected a second performance instrument,
(i) identifying within said voice bank at least one second audio loop having a same instrument present in said second audio loop as said second performance instrument;
(ii) automatically accessing a second performance audio loop from among said identified at least one second audio loops;
(o) if the user does not select a second performance instrument,
(i) automatically accessing said second performance audio loop from among said identified at least one first audio loops;
(p) automatically modifying said accessed second loop at least according to
said performance tempo value,
said performance key, and
either said first performance song part or said second performance song part if
said second performance song part was selected,
thereby producing a modified second performance audio loop;
(q) automatically adding said modified second performance audio loop to said performance of said modified first performance audio loop in real time during said performance of said modified first performance audio loop to create a combined performance,
wherein said modified second audio loop is added during a next bar after said current bar, thereby composing said musical work; and
(r) creating an audible representation of said combined performance for the user, thereby composing said musical work.

2. The method according to claim 1, further comprising the steps of:
(s) during said combined performance for the user, performing at least steps (k) through (p) to obtain a modified third audio loop;
(t) automatically adding said modified third audio loop to said combined performance in real time, thereby forming said musical work.

3. The method according to claim 1, wherein each of said at least one associated song parts comprises one or more of an intro, a verse, a bridge, a chorus, and an outro.

4. The method according to claim 1, wherein said first performance song part and said second performance song part are a same song part.

5. The method according to claim 1, further comprising the step of:
(u) storing at least a portion of said composed musical work on a computer readable medium.

6. The method according to claim 1, wherein said harmony suitability value is either provided by the user or determined by an analysis of said audio loops in said performance bank.

7. The method according to claim 6,
wherein said harmony suitability value compares a selected one of said audio loops with a selected different one of said audio loops, and
wherein said comparison comprises a comparison of one of more of
a tone pitch of said selected one of said audio loops with a tone pitch of said selected different one of said audio loops,
a tempo of said selected one of said audio loops with a tempo of said selected different one of said audio loops, and a note scale of said selected one of said audio loops with a note scale of said selected different one of said audio loops.

8. The method according to claim 1, wherein said two or more parameters variable between a high value and a low value include at least one of a center frequency and a reverb amount.

9. A method of performing a musical work for a user, comprising the steps of:
(a) using a computer having a computer display to access a clip database containing a plurality of audio clips, each of said plurality of audio clips being associated with at least one clip music style,
  an indicium of an instrument or instruments recorded in said audio clip,
  at least one clip song part,
  a clip tempo value;
(b) requiring the user to select using a graphical user interface visible on said computer display
  a performance music style,
  a performance key, and
  a performance tempo;
(c) using said computer to assemble a voice bank, wherein said voice bank is comprised of two or more of said plurality of audio clips, each of said assembled two or more audio clips having a same clip music style as said performance music style;
(d) presenting a representation of at least a portion of said two or more audio clips in said voice bank to the user on said computer display device;
(e) requiring the user to select from said displayed representation a first clip from among said assembled two or more audio clips using said graphical user interface;
(f) modifying said first clip at least according to said performance tempo and said performance key, thereby producing a modified first clip;
(g) creating an audible performance of said modified first clip for the user;
(h) during said time when said first clip is being performed, requiring the user to select in real time from said displayed representation of said voice bank a clip different from said first clip using said graphic user interface, thereby selecting a second clip;
(i) during said time when said first clip is being performed,
  (i) presenting to the user a window on said computer display containing indicia representative of two or more parameters, wherein each of said two or more parameters is simultaneously variable between a high value and a low value by way of a stroke across a face of said window;
  (ii) receiving said stroke across the face of said window from the user, thereby receiving modified values of at least one of said two or more parameters;
  (iii) modifying said audible performance of said modified first clip in real time according to said received modified values of at least one of said two or more parameters;
(j) modifying said second clip at least according to said performance tempo and said performance key, thereby producing a modified second clip;
(k) determining a next beat in said audible performance of said modified first clip;
(l) automatically adding said modified second clip to said performance of said modified first clip at said next beat, thereby creating a combined performance;

(m) creating an audible representation of said combined performance for the user;
(n) performing at least steps (g) through (m) a plurality of times with a plurality of different modified second clips, with each of said different modified second clips replacing said modified first clip in turn, thereby creating a composite musical work;
(o) continuously recording without interruption said combined performance during at least said steps (g) through (m) from a start of said performance of said modified first clip until an end of a performance of a last one of said modified second clips, thereby creating a recording of said musical work; and
(p) performing at least a portion of said recording of said musical work for the user.

10. The method of performing a musical work according to claim 9, wherein each of said audio clips contain recordings of one or more of a horn, a guitar, a vocal performance, a drum, a harmonica, and a violin.

11. The method of performing a musical work according to claim 9, further comprising the step of:
(q) storing at least a portion of said recording of said musical work on a computer readable medium.

12. A method of performing a musical work for a user, comprising the steps of:
(a) accessing a clip database containing a plurality of audio clips, each of said plurality of audio clips being associated with at least one clip music style;
(b) requiring a user to select a music style;
(c) selecting a tempo and a key;
(d) assembling a voice bank, wherein said voice bank is comprised of two or more of said plurality of audio clips, each of said assembled two or more audio clips having a same music style as said selected music style;
(e) presenting a representation of said two or more audio clips in said voice bank to the user on a computer display device;
(f) requiring the user to select a first clip from said displayed representation of said two or more clips;
(g) modifying said selected first clip at least according to said tempo and said key, thereby producing a modified first clip;
(h) creating an audible performance of said modified first clip in said selected music style for the user;
(i) during said audible performance of said modified first clip,
  (i) presenting to the user a window on a computer display containing indicia representative of two or more parameters, wherein each of said two or more parameters is simultaneously variable between a high value and a low value by way of a stroke across a face of said window;
  (ii) receiving said stroke across the face of said window from the user, thereby receiving modified values of at least one of said two or more parameters;
  (iii) modifying said audible performance of said modified first clip in real time according to said user's received modified values of at least one of said two or more parameters;
(j) determining a next beat in said audible performance of said modified first clip;
(k) during said performance of said modified first clip, requiring the user to select in real time from said displayed representation of said two or more clips in said voice bank a clip different from said first clip during said performance of said modified first clip, thereby selecting a second clip;

(l) modifying said second clip at least according to said tempo and said key, thereby creating a modified second clip;
(m) automatically adding said modified second clip to said performance of said modified first clip in real time during said performance of said modified first audio clip to create a combined performance, wherein said modified second clip is added at said next beat of said audible performance of said modified first clip thereby performing the musical work for the user; and
(n) creating an audible representation of said combined performance for the user.

13. The method according to claim 12, further comprising
(o) during said combined performance, requiring the user to select a third clip different from said first clip and different from said second clip from said displayed representation of said two or more clips in said voice bank;
(p) modifying said third clip at least according to said tempo and said key, thereby creating a modified third clip;
(q) automatically adding said modified third clip to said combined performance in real time to create an extended performance, wherein said modified third clip is added at a moment that is musically synchronous with said combined performance;
(r) performing the said extended performance for the user;
(s) continuously recording without interruption said combined performance and said extended performance, thereby creating a recording of said musical work; and
(t) performing said recording of said musical work for the user.

* * * * *